(12) United States Patent
Kraus

(10) Patent No.: US 11,227,032 B1
(45) Date of Patent: Jan. 18, 2022

(54) DYNAMIC POSTURE ASSESSMENT TO MITIGATE REVERSE ENGINEERING

(71) Applicant: Amazon Technologies, Inc., Seattle, WA (US)

(72) Inventor: Holger Kraus, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 282 days.

(21) Appl. No.: 15/604,599

(22) Filed: May 24, 2017

(51) Int. Cl.
```
H04L 29/06      (2006.01)
G06F 21/14      (2013.01)
H04L 9/08       (2006.01)
G06F 8/60       (2018.01)
```

(52) U.S. Cl.
CPC .............. *G06F 21/14* (2013.01); *H04L 9/083* (2013.01); *H04L 63/0428* (2013.01); *H04L 63/0884* (2013.01); *H04L 63/1433* (2013.01); *H04L 63/166* (2013.01); *H04L 63/205* (2013.01); *G06F 8/60* (2013.01); *H04L 63/0435* (2013.01); *H04L 63/0442* (2013.01); *H04L 63/10* (2013.01)

(58) Field of Classification Search
CPC ... H04L 63/00; H04L 63/166; H04L 63/1502; H04L 63/0428; H04L 63/0884; H04L 63/1433; H04L 63/0435; H04L 63/0442; H04L 63/10; H04L 9/083; G06F 21/00; G06F 21/14; G06F 8/60
See application file for complete search history.

(56) References Cited

U.S. PATENT DOCUMENTS

| | | | |
|---|---|---|---|
| 7,096,502 B1 | 8/2006 | Fox et al. | |
| 7,657,942 B2 | 2/2010 | Himberger et al. | |
| 9,946,493 B2* | 4/2018 | Acedo | G06F 3/0604 |
| 10,949,540 B2* | 3/2021 | Andrews | G06F 21/64 |
| 2002/0184310 A1* | 12/2002 | Traversat | G06F 9/4416 709/204 |
| 2005/0204032 A1 | 9/2005 | Mirza-Baig | |
| 2005/0289264 A1* | 12/2005 | Illowsky | G06F 1/3203 710/104 |
| 2006/0224742 A1* | 10/2006 | Shahbazi | H04L 63/105 709/226 |

* cited by examiner

*Primary Examiner* — Joseph P Hirl
*Assistant Examiner* — Leynna Truvan
(74) *Attorney, Agent, or Firm* — Robert C. Kowert; Kowert, Hood, Munyon, Rankin & Goetzel, P.C.

(57) ABSTRACT

Methods and associated systems are provided to perform a security posture assessment (PA) of a device based on a PA process implemented on a server but not statically stored on the device. The method includes generating, by the server, commands to be performed by a dynamic command executor on the device. The dynamic command executor is configured to dynamically launch and execute system modules on the device, based on the commands, to perform operations in the PA process. The commands and the results may be exchanged between the server and the device via a secure communication connection. The commands may be sent in a message with an encryption key that encrypts the messages, and the received command results may also be encrypted using the encryption key. By not statically storing the PA process on the device, the PA process is protected from reverse engineering attacks.

20 Claims, 9 Drawing Sheets

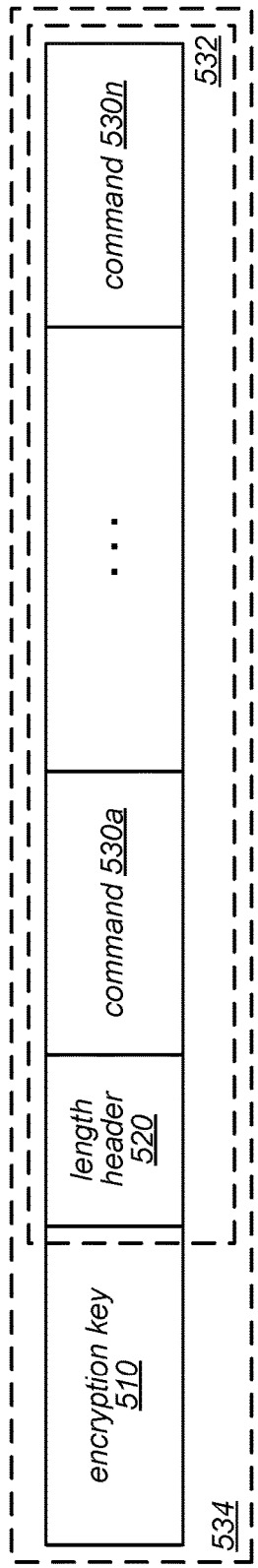
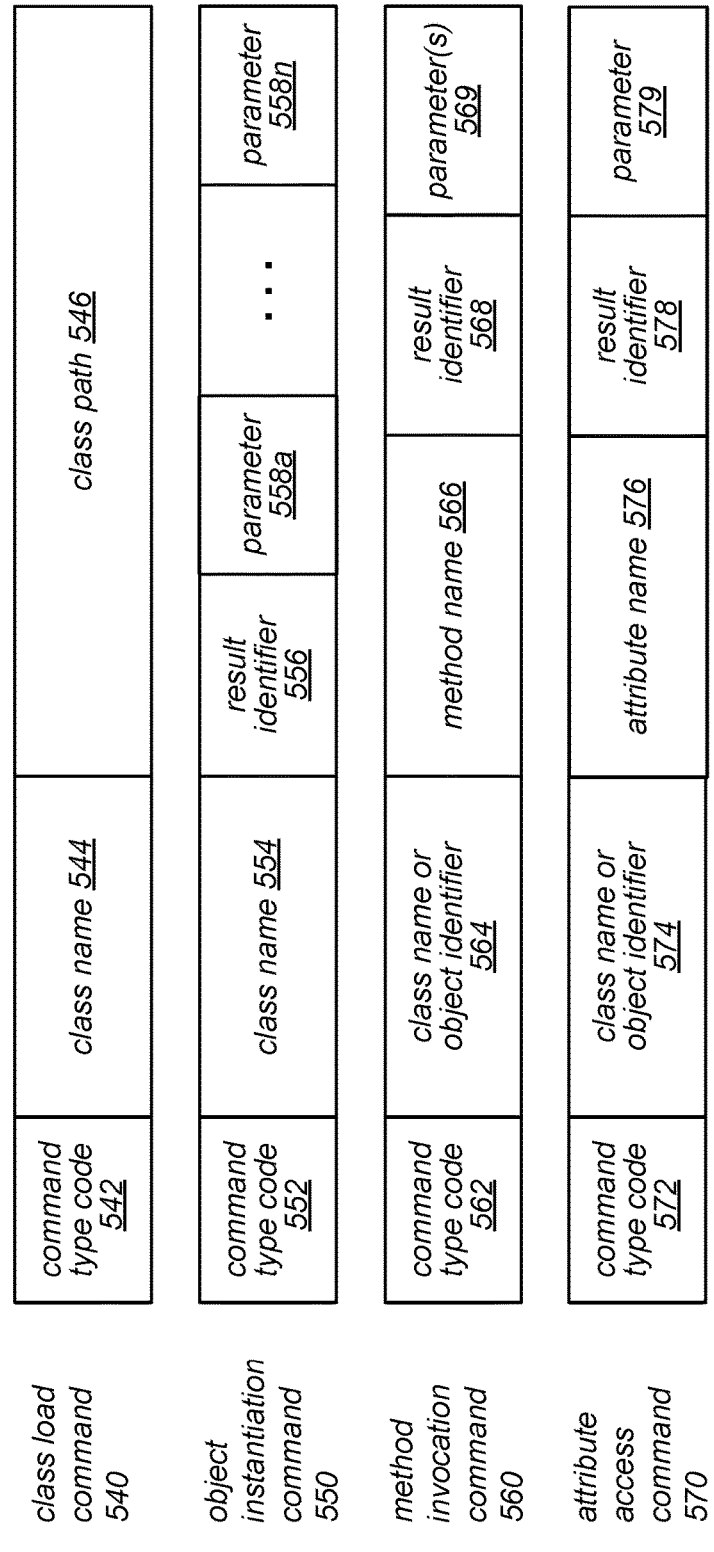
FIG. 5A
FIG. 5B

DYNAMIC POSTURE ASSESSMENT TO MITIGATE REVERSE ENGINEERING

BACKGROUND

Company computer networks are storing ever-increasing amounts of proprietary data, which must be protected from unauthorized access. Increasingly, companies are implementing network admission control (NAC) systems to restrict an untrusted device's ability to access a company's computer network based on a posture assessment (PA) of the device. For example, before allowing a device to connect to a restricted network, the NAC may examine the state of the device to determine whether it might be a threat to the network. If so, the device may be prevented from connecting to the network. Alternatively, it may be connected to a quarantine network which it can use to patch itself before being allowed to connect to the network with full access. Although existing posture assessment techniques can protect networks from unauthorized accesses, in some cases they are vulnerable to a reverse engineering attack. In particular, in some cases, posture assessment software is loaded onto untrusted devices. Once posture assessment software is stored and executed on the device, it may be exposed to attacks from malicious software on the device. For example, an attack may attempt to reverse engineer the posture assessment software to determine elements of the posture assessment procedure of the NAC system that are embedded in the software. In some cases, communications between the device and the NAC system are also subject to different types of network attacks, such as man-in-the-middle attacks.

BRIEF DESCRIPTION OF THE DRAWINGS

FIGS. 5A and 5B illustrate example message and command data formats used in a dynamic posture assessment system, according to some embodiments.

Figure 1:
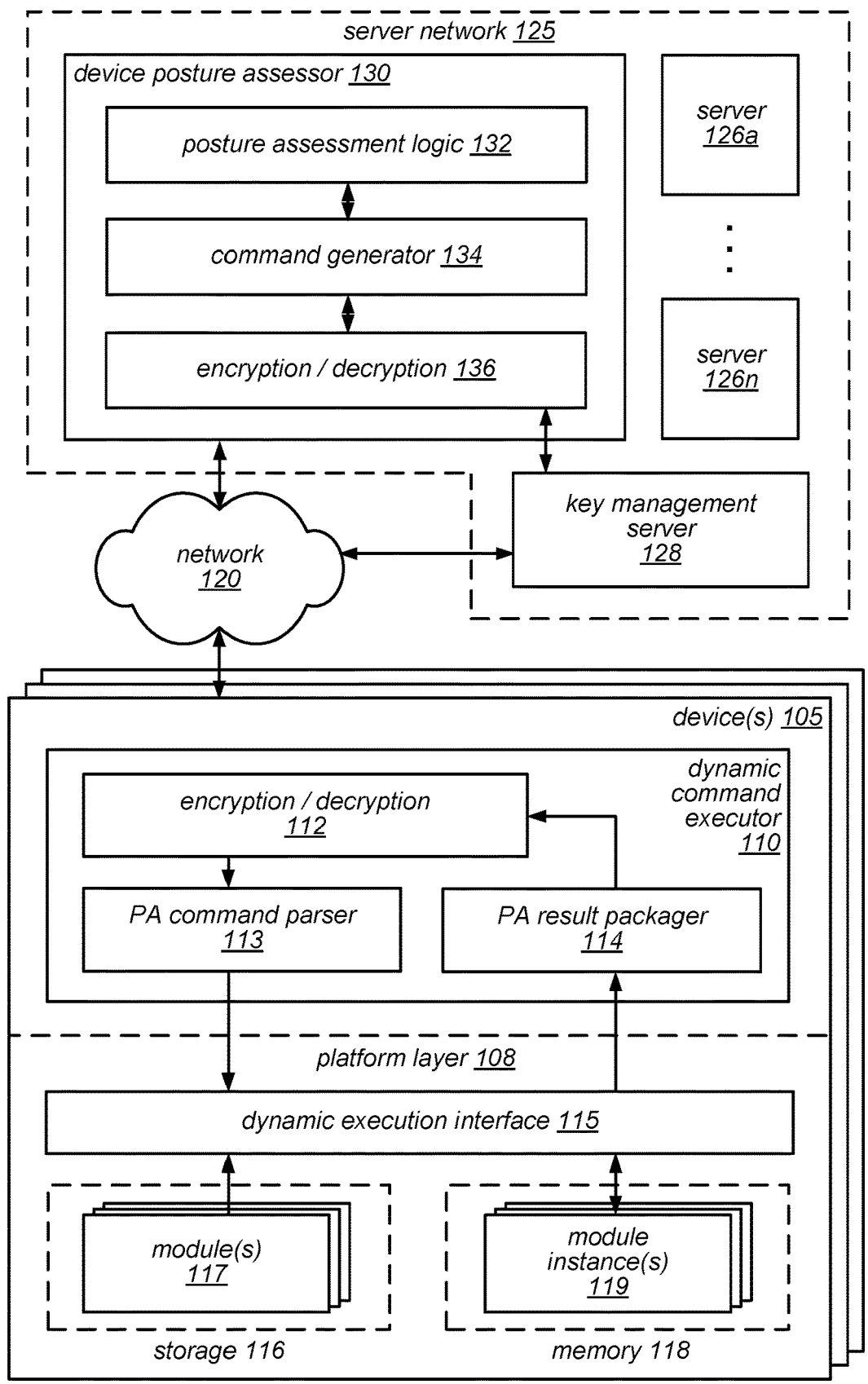
FIG. 1 is a block diagram illustrating an example computer system that implements a dynamic posture assessment system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a dynamic posture assessment system. Companies employ network admission control (NAC) systems to protect their networks from unauthorized accesses, thereby allowing only authorized users of verified devices into the "trust domain" of the network and network services. Remote computing devices that request access to the network may be inspected by the NAC to verify the security configuration of the devices, before the devices are granted access. The posture assessment (PA) performed by the NAC may be performed in accordance with on a proprietary device PA procedure. Disclosure of such proprietary information to the public may compromise the PA process. For example, in some scenarios an attacker who has seen the PA procedure may architect an environment that successfully passes the PA process every time.

One part of the PA process that is subject to attack is the PA client software that is installed on the subject device. For example, in the world of ANDROID™, apps are under a constant threat from attackers since their code can be easily decompiled, and thus security checks can be easily circumvented. Reverse engineering of software on a mobile device is difficult to prevent. For example, many client applications are written in pre-compile languages like Java, and source code can easily be reconstructed from the code that are distributed to the device. This is presents a problem for client software (such as PA client software) that embeds the company's PA procedure.

Current attempts to dealing with these problems have not been completely successful. For example, software may be distributed in native or obfuscated form. But such efforts complicate the development process and generates executables that are not always compatible with all device platforms. Moreover, these executables are still not completely immune from reverse engineering. In addition, even where the executables themselves are not decipherable, in some cases their runtime memories may be obtained, for example through a memory dump.

Accordingly, to mitigate the reverse engineering of client PA software, a dynamic posture assessment system is disclosed herein, according to some embodiments. In some embodiments of the system, the PA server generates commands to a thin PA client. The PA client does not statically store any proprietary code or information (e.g., the company's PA procedure), so that such information is not ever stored on the device. Instead, the PA client simply receives and dynamically executes the commands from the server, and then transmits the results of the commands back to the server. In some embodiments, the dynamic execution may be performed using a dynamic execution library that is part of the device's execution environment, such as the Java Reflection library. The commands and results are transmitted over a secure connection between the device and server. In some embodiments, the communications may be further encrypted using a one-time encryption key that is generated and sent by the server. By sending PA commands from a remote endpoint and dynamically executing the commands, attackers will have little opportunity to observe what is actually happening on the device. These and other benefits and features of the dynamic posture assessment system are discussed in further detail below, in connection with the exemplary embodiments shown in the figures. These include, for example, various aspects of the PA client, which may be configured to store the commands and results in such a way to minimize the observability of the commands, various ways of encrypting the commands and results to protect them during network transmission, and various ways of encoding the commands to create a flexible remote execution framework to perform PA operations on the device.

FIG. 1 is a block diagram illustrating an example computer system that implements a dynamic posture assessment system, according to some embodiments. As shown, the system may include one or more device(s) 105, which may encompass any type of device configurable to access the server network 125, over the network 120.

In various embodiments, the network 120 may encompass any suitable combination of networking hardware and protocols necessary to establish network-based communications between device 105 and server network 125. For example, a network 120 may generally encompass the various telecommunications networks and service providers that collectively implement the Internet. A network 120 may also include private networks such as local area networks (LANs) or wide area networks (WANs) as well as public or private wireless networks. For example, both a device 105 and the server network 125 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the device 105 and the Internet as well as between the Internet and server network 125. In some embodiments, device 105 may communicate with server network 125 using a private network rather than the public Internet.

The device(s) 105 may be wireless or mobile computing devices such as smartphones, tablets, laptops, or the like. However, in some embodiments, the device 105 may be a wired computing system, such as one or more desktop computers. In some embodiments, the device 105 may utilize a cellular-based communication infrastructure that includes cellular-based communication protocols such as AMPS, CDMA, TDMA, GSM (Global System for Mobile communications), etc. A user associated with the device 105 may wish to gain access to the server network 125 via the device 105. However, the server network may be restricted, such that before the device 105 is allowed to access the server network 125, a posture assessment must be performed on the device 105.

The server network 120 may encompass any type of network that implements restricted access to outside devices. For example, the server network 120 may be a restricted company network, which includes company servers 126*a-n*. The server network 125 may implement applications that are proprietary to the company, and store data that are proprietary to the company. For example, in some embodiments, the server network 125 may implement one or more email servers, enterprise application servers, internal application store servers, authentication servers, directory servers, Virtual Private Network (VPN)/SSL gateways, firewalls, among other servers and components. In some embodiments, the server network 125 may store company data in one or more file servers or databases.

In some embodiments, the server network 125 may implement a device posture assessor 130 and a key management server 128, which may be part of a larger mobile device management (MDM) system operated by the company. The MDM system may implement a variety of functions to administer mobile devices that access the company's network, including both company-owned and user-owned devices. In some embodiments, the MDM system may be implemented in a third-party cloud, rather than the company's premises. In some embodiments, when a device is managed by the MDM system, MDM client software may be loaded onto the device. Such client software may include, for example, the PA software to initially (and possibly continuously) assess the security posture of the managed device. In some embodiments, the managed device may be configured by the client software. In some embodiments, the managed device may be monitored via the client software. Although this disclosure is primarily presented in the context of a posture assessment process, it is contemplated that all types of client software associated with the MDM may be implemented using the dynamic execution approach disclosed herein.

The device posture assessor 130 may be implemented on one or more servers in the server network 125. In some embodiments, the device posture assessor 130 may be tasked with performing an initial assessment of new and untrusted devices, so that they are recognized by and permitted to access the server network 125. In some embodiments, if the posture assessment of a new device is successful, the new device is registered with the server network 125 under a unique device identifier, and various configurations in the server network 125 (e.g., access control lists, etc.) are updated to include the registered device. In some embodiments, additional software may be pushed to the registered device to allow the server network 125 to configure and/or otherwise manage the registered device. As shown, the device posture assessor 130 may include posture assessment logic 132, a command generator 134, and an encryption/decryption module 136.

The posture assessment logic 132 may implement a PA procedure for new devices to verify the security configuration of the devices before they are permitted to access the network. The PA procedure may include information such as, for example, the device properties and/or metadata that are checked during the PA process, the device's files that are examined, the various assessment rules that are applied, and also various actions that are performed on the device during the PA process. In the illustrated system, such proprietary information is not statically stored on the device 105. Rather, the PA process is performed by sending individual PA commands to the device at runtime, to be performed by a thin client software located on the device. The PA commands that implements the PA process are not statically stored on the device.

The command generator 134 may be tasked with the generation of PA commands to the device during the PA process. In some embodiments, the command generator 134 may dynamically generate PA commands based on the PA procedure of the server network 125. In some embodiments, the PA generator 134 may simply store the commands in one or more command files. In some embodiments, the command generator 134 is a layer in a larger application, and presents a call interface (e.g., an API) to the layers above, such as the PA logic 132. The PA logic 132 may make calls to the command generator 134 based on its execution flow, to generate PA commands to the device. In some embodiments, the PA process may entail multiple exchanges between the server 130 and the device 105, where the server sends one or more PA commands, and the device responds with one or more results. In some embodiments, the command generator 134 may also receive the results from the device 105, and decode it to a format that is usable by the PA logic 132.

The encryption/decryption module 136 may perform the encryption of outgoing messages from the device posture assessor 130, and the decryption of incoming messages to the device posture assessor 130. The encryption and decryption steps may be performed by a variety of methods. For example, in some embodiments, the encryption may be performed using an encryption key. The encryption key may be a symmetric key that is the same for encryption and decryption, or a key in an asymmetric key pair, where one key is used for encryption and another key is used for decryption. In some embodiments, the keys may be one-time session keys that are generated as needed. In some embodiments, the keys may be persisted in a key manager server 128, which stores keys in encrypted form and provide the keys to requestors in a secure manner. In some embodiments, the encryption/decryption functionality may be implemented as a part of the communication protocol, for example, in the Secure Sockets Layer (SSL) or Transport Layer Security (TSL). In some embodiments, multiple layers of encryption and decryption may be used to ensure additional security of the network transmissions.

Turning now to the devices 105, the devices 105 may implement another encryption/decryption module, which acts as a counterpart to the encryption/decryption module 136 of the device posture assessor 130. Thus, incoming messages received from the server 130 may be decrypted, and outgoing messages bound for the server 130 may be encrypted. In some embodiments, the encryption and decryption key may be the same. In other embodiments, different keys may be used for the two directions. For example, in some embodiments, the device 105 may encrypt outgoing messages using the server's public key, which may be decrypted using a private key held by the server, while the server may encrypt its messages using the device's public key, which may be decrypted using a private key held by the device. The public keys may be exchanged in a variety ways, for example, in an initial handshake process, or via the key management server 128. As discussed, in some embodiments, the key(s) may be one-time session keys that are generated as needed, and used for one message, one group of messages, or in some cases a particular part of a single message. In some embodiments, the encryption/decryption functionality may be layered. For example, the server and device may use a Transport Layer Security (TSL) as a first layer of encryption, and a per-message session key as a second layer of encryption.

As shown, in the illustrated device 105, the device 105 may implement a dynamic command executor 110, which includes the encryption/decryption module 112, a PA command parser 113, and a PA result packager 114. The PA command parser 113 may parse or interpret the decrypted commands and convert them into calls to a dynamic execution interface 115, which in turn launches and executes the modules 117 on the device. In some embodiments, the PA command parser 113 may decode each command to retrieve a type code indicating the type of command, any input parameters associated with the command, and any result identifiers associated with the command. The PA command parser 113 may then be responsible for actually issuing calls to the dynamic execution interface 115, based on the command types and the input parameters, etc. In some embodiments, the calls to the dynamic execution interface 115 may generate return values. These return values may be collected by the dynamic command executor 110 in a results buffer, and then packaged by the PA result packager 114. The PA result packager may perform an encoding of the results (e.g., converting the results to a binary format known to the server 130). The packaged results are then encrypted and sent back to the device posture assessor 130.

The dynamic execution interface 115 may present a call interface that can be used by the dynamic command executor 110 to launch and execute the device's system modules 117. In some embodiments, the dynamic execution interface 115 may be part of the device's platform layer 108, which includes the operating system of the device. The operating system may provide an interface, for example in Java, to access certain parameters or functionality of the operating system. For example, the modules 117 may be part of preexisting software loaded on the device. In some cases, the system modules may be part of the operating system of the device. For example, in some cases, a module 117 may implement a simple facility to manipulate files, without statically storing information (in code, configuration file, or otherwise) specifying which files or which parts of the files are to be read or written.

In some embodiments, the dynamic execution interface 115 may implement a mechanism to allow a caller to dynamically load, instantiate, and execute the modules 117 stored on the device's storage 116. Thus, the dynamic execution interface 115 may embed no information about the PA process. Rather, it simply launches and executes the modules 117 on demand, according to the calls that are received. In some embodiments, the dynamic execution interface 115 may be implemented using a runtime reflection library that enables dynamic loading and execution of modules on the device. One example of such a library is the Java Reflection library, which allows Java classes to be dynamical loaded into memory and executed in a Java virtual machine based on runtime information (e.g., the name of the class to be loaded, the name of a method to be executed, etc.) In this manner, the dynamic command executor 110 may simply pass the commands it receives to the dynamic execution interface 115. Neither the dynamic command executor 110 nor the dynamic execution interface 115 statically stores any information about the PA procedure that is performed. This command-driven process thus mitigates the risk of a reverse engineering of any modules on the device to reveal proprietary information about the PA procedure.

In operation, the dynamic execution interface 115 may load one or more modules 117 into the execution memory 118 of the device. In some embodiments, the modules 117 may be Java classes located on the device, and the execution may be a Java virtual machine process that is launched to host the loaded classes. The modules 117 may in some cases be platform modules (e.g., ANDROID™ modules) that were installed with the device.

In some embodiments, after loading a module 117 into memory, the dynamic execution interface 115 may instantiate an in-memory instance 119 of the module 117. In some embodiments, one or more methods or attributes of a module 117 or instance 119 may be invoked by the dynamic execution interface 115, in accordance with the received PA commands. The loading, instantiation, and execution may occur completely dynamically, based purely on the received commands at runtime. For example, in some embodiments, the commands may specify the names of classes to load, the names of objects to instantiate, and the methods and/or attributes to access. As discussed, in some embodiments, the dynamic execution interface 115 may comprise the Java Reflection API, and use the Java Reflection functionality to collect results from executing Java modules. The results produced by the Java modules may be provided to the dynamic command executor 110, and then sent back to the server 130.

In some embodiments, the device posture assessor 130 and device 105 may exchange a number of sets of commands and results during a single PA procedure. For example, the server 130 may first send a first set of commands to determine the general type of the device 105. Based on the device's responses from the first command set, the server 130 may select or generate a second set of commands to further assess the device 105, for example to obtain the device's operating system version number, version-specific security patches, etc.

In some embodiments, once sufficient PA results are obtained from the device, the device posture assessor 130 examine the results to determine if the device complies with a security policy of the server network 125. For example, the device posture assessor 130 may base its verification on data such as the version of the operating system of the device, one or more build flags used to build the version of the operating system, whether the device is configured to permit root user access, applications that are installed on the device, security patches that are installed on the device, or one or more security settings of the device. In some cases, the security policy may require that the device have certain security features turned on, such as device PIN or encryption. In some cases, the security policy may check that the device does not have installed certain blacklisted apps. In some cases, the security policy may check whether the device has been rooted, that is, allow the user gain root user access to the device. This check may be performed by, for example, checking the common locations of the "su" or "switchuser" executable that is needed to switch into root mode on ANDROID' systems.

Based on the determination of whether the device complies with the security policy, the device posture assessor 130 or another server may perform a number of security actions in connection with the device. Such actions may include, for example, granting an access privileged to the device, sending security software to the device, or updating a security setting on the device. For example, in some embodiments, based on the determination, the device may be permitted to connect to other servers in the server network (e.g., server network 125). In some embodiments, the device may be added to a registry of devices that are known by the server network (e.g., by storing the device's ID in an access list). In some embodiments, after the device passes the PA process, additional software such as a company's proprietary software may be pushed to the device. In some cases, servers in the server network may initiate communication with the device to make adjustments to the security settings on the device. In some embodiments, the PA process may occur as a periodic check of the device by the server network, to occasionally verify that the health and compliance of the device. For example, a server network may implement a periodic process (e.g. monthly check) to examine all of its employees' devices to check for any malware that may have been installed on these devices.

It should be noted that although the dynamic loading, instantiation, and invocation operations are discussed above primarily in the context of Java Reflection, other suitable methods of performing runtime reflection may be used. For example, the .NET™ framework also implements a reflection functionality similar to the Java Reflection libraries. As another example, dynamic loading and invocation of modules are also supported by IOS™. All of these different frameworks may be used to implement the dynamic execution interface 115, without departing from the inventive concepts described herein.

Figure 2:
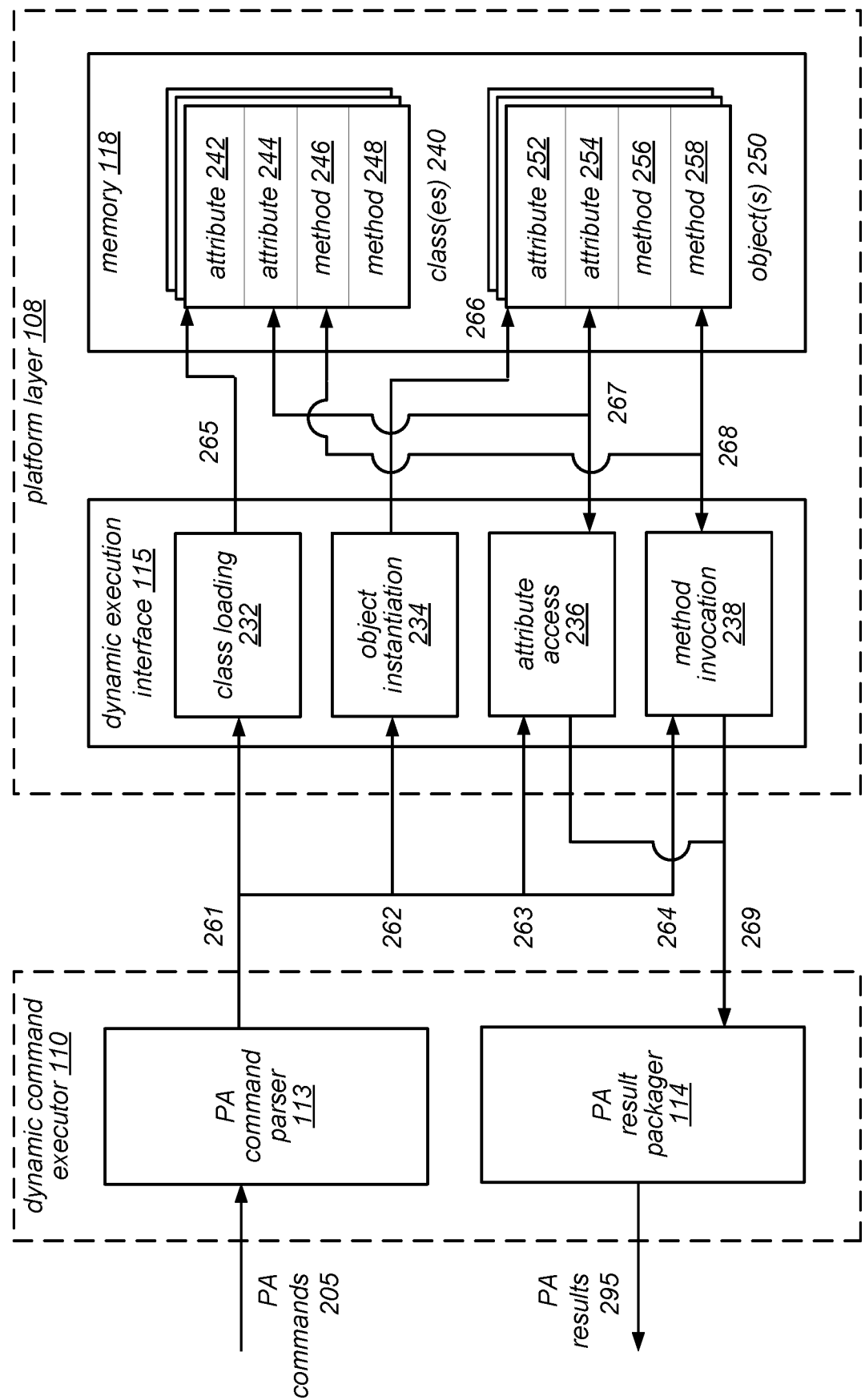
FIG. 2 is a block diagram illustrating device-side components of a dynamic posture assessment system, according to some embodiments.

FIG. 2 is a block diagram illustrating device-side components of a dynamic posture assessment system, according to some embodiments. In particular, the figure illustrates an embodiment of the dynamic command executor 110 and the platform layer 108, as discussed in connection with FIG. 1. As illustrated, incoming commands 205 from a PA server may be received by the dynamic command executor 110. The commands 205 may first be decrypted by a decryption module (e.g. encryption/decryption module 112 shown in FIG. 1), which is not shown in the figure.

In some embodiments, the commands 205 are then parsed or decoded by the PA command parser 113. The PA command parser 113 may parse the commands 205 according to a command protocol, to determine the type of each command and the parameters of each command, before they commands are forwarded to the platform layer 108. The commands 205 may be encoded in different forms. For example, in some embodiments, the commands may be encoded in a format such as eXtensible Markup Language (XML). In other embodiments, the commands may be encoded in a binary format. In some embodiments, the command format may be inherently encrypting, so that the parsing and decoding is performed in conjunction with the decryption step.

As illustrated, the PA command parser 113 in this example recognizes four different types of commands, which correspond to four different types of calls exposed by the dynamic execution interface 115, which are handled by four different sub-modules. Class loading type commands 261 are forwarded to the class loading sub-module 232. The class loading module 232 may be configured to dynamically load 265 a class, by class name, into the device's execution memory 118. In some embodiments, the class loading module 232 may look for modules or classes in one or more specified locations, such as a file or one or more locations specified in a class path. Once a class specified by the class name is identified, it is loaded into memory by the class loading module 232.

Objection instantiation type commands 262 are forwarded to the object instantiation sub-module 234. The object instantiation module 234 may be configured to dynamically create 266 an instance of a loaded class (e.g., a runtime object). The creation of the instance may involve invocation of an object initiation routine, which may be referred to as a "constructor." The commands 262 may optionally specify one or more parameters for the initiation or constructor routine, and also a result identifier that may be used reference the instantiated object in later commands. Thus, for example, a first object of class C may be created under the result identifier "obj1" and a second object of class C may be created under another result identifier "obj2."

Attribute access type commands 263 are forwarded to the attribute access sub-module 236. The attribute access module 236 may be configured to dynamically access 267 attributes of loaded classes or instantiated objects in the memory 118. In some systems, attributes may be associated with either classes 240 or individual objects 250. Accordingly, the commands 263 may specify the name of an attribute 244 or 252, along with an object identifier or a class name. In some embodiments, the commands 263 may include different forms that instruct the attribute access module 236 to both read and write an attribute. Thus, for example, a PA command may instruct the device to set a device property on the device to a new value. In some embodiments, a command 263 may return a value. In such cases, the command 263 may include a result identifier to associate with the result value to be used in later commands. In some embodiments, the result identifier may also be included in the return message to the PA server to identify the command's return value in the return message.

Method invocation type commands 264 are forwarded to the method invocation sub-module 238. The method invocation module 238 may be configured to dynamically invoke 268 methods of loaded classes or instantiated objects in the memory 118. In some systems, methods may be associated with either classes 240 or individual objects 250. Accordingly, the commands 264 may specify the name of a method 246 or 258, along with an object identifier or a class name. The invoked method may return a value or simply perform a task. If the method returns a value, the command 264 may include a result identifier to capture the result value to be used in later commands. In some embodiments, the result identifier may also be included in the return message to the PA server to identify the command's return value in the return message.

As illustrated, the attribute access module 236 and method invocation module 238 may return results in response to execution of various commands. These results may be forwarded 269 to the PA result packager 114 to be packaged or encoded, before they are transmitted 295 back to the PA server. In some embodiments, the encoding may be performed in conjunction with an encryption. In some embodiments, the packager may buffer the results from multiple commands, possibly in encrypted form, and send all results back to the PA server in one batch. In this case, the packaging may associate individual command results with the result identifier, so that the PA server can identify the the results of different commands using the results identifier. In other embodiments, the results may be sent back one at a time. The results may be encoded in a variety of forms, depending on the embodiment. For example, in some cases, the results may be formatted as XML data, or in other cases binary data. The results may be packed in an order that is expected by the PA server, for example, in the same order as the PA commands.

Both the commands and the results may be stored temporarily in the execution memory of the device (e.g., device 105). In some embodiments, the device may use techniques to minimize the risk of reverse engineering by minimizing the amount of time that such information is stored as cleartext in the device's memory. Thus, a random memory dump of the dynamic command executor 110 by a malicious software on the device may produce little if any usable information.

In some embodiments, the sensitive data such as commands and results may be stored such that they are deallocated immediately after they are used, or immediately after the PA procedure. For example, in some embodiments where the Java execution environment is used, the commands, including command parameters, are stored as character arrays or native data types as much as possible. In Java, native data types are allocated on the execution stack, and are deallocated immediately with the stack frame. In some embodiments, this is preferable to storing the commands and/or command parameters as Java objects, which are allocated in the object pool, and are not deallocated until they are garbage collected by the Java virtual machine.

Other techniques to minimize observability of these values in memory may also be used, depending on the embodiment. In some embodiments, the commands and/or results may be kept in encrypted form in memory for as long as possible, until they are needed. Likewise, the results produced by the commands may be encrypted immediately. In some embodiments, commands may be decrypted one at a time, and executed using one method call at a time, so that at any given point, only data associated with one command is observable in decrypted form. In some cases, parameters or results may need to be converted to Java objects as required by the API of platform classes (e.g., certain platform classes that require "String" input). In that case, the PA commands may be organized to allocate the Java objects, but attempt to deallocate or overwrite the data in the Java objects as soon as they are no longer needed. For example, in some cases, the PA commands may maintain a pool of reusable Java objects (e.g. String objects) to be used as input parameters, and repeatedly overwrite their contents after use. In some embodiments, the dynamic command executor 110 may make system calls to the Java virtual machine to garbage collect. In some embodiments, the dynamic command executor 110 may invoke separate JVM processes for different commands, so that all data associated with one set of commands are deallocated with the JVM process. Using these techniques, the PA process can avoid maintaining large amounts of sensitive data in memory for an extended period of time.

Figure 3:
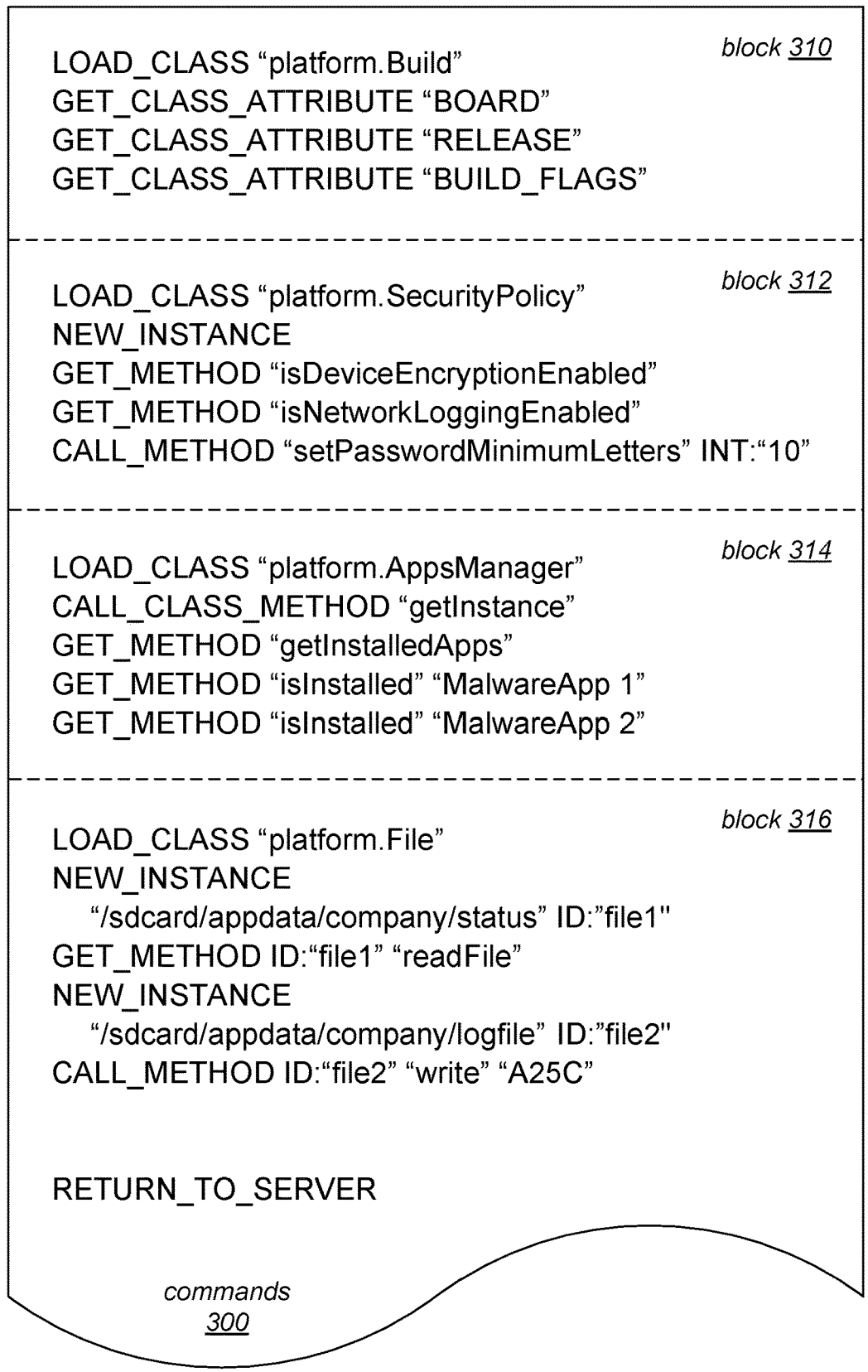
FIG. 3 illustrates an exemplary set of commands that are used in a dynamic posture assessment system, according to some embodiments.

FIG. 3 illustrates an exemplary set of commands that are used in a dynamic posture assessment system, according to some embodiments. The commands may be generated, for example, by command generator 134 as discussed in connection with FIG. 1, to perform a PA procedure on a device. The commands are shown unencrypted and formatted in one particular form. However, in some embodiments, the commands may be stored in other formats, such as XML for binary formats. In embodiments where dynamic execution is based on a runtime reflection library like Java Reflection, the commands may simply correspond to the API calls of the runtime reflection library, and the command parameters may be the class, method, and attribute names of the system modules on the device.

As illustrated, the commands 300 are organized into multiple blocks 310, 312, 314, and 316. In some embodiments, each individual block may be sent as a separate file to the device. In some embodiments, a single command file may be sent to the device, and the file may include block delimiters to separate the logical blocks in the commands. In some embodiments, each block may represent an independent unit of commands that can be executed without reference to other blocks.

In block 310, a first command LOAD_CLASS loads a class named platform.Build. In some embodiments, the LOAD_CLASS command may be specified simply as a command type code. The LOAD_CLASS command may correspond to an API call in a runtime reflection library, such as the Java Reflection library, which exposes a method to load a Java class. The other three commands in block 310 are GET_CLASS_ATTRIBUTE commands that retrieves class attributes BOARD, RELEASE, and BUILD_FLAGS from the class platform.Build. In Java and other programming languages, certain attributes are associated with the class, so that they are accessible without instantiating any objects of the class. In some embodiments, commands such as GET_CLASS_ATTRIBUTE commands may, by default, take the result of the command (e.g., the value of the respective class attributes), and place those values in a results buffer to be sent back to the AP server. In some embodiments, the results are stored in the same order as the commands that produced the results. In some embodiments, the results are encrypted immediately, so that they are stored in the results buffer in encrypted form.

In some embodiments, when block 310 finishes executing its commands, all objects and/or data associated with the block may be deallocated or overwritten. For example, the objects that are used to make calls to the Java Reflection library may be deallocated or overwritten. In some embodiments, all of the data on used for the block may be deallocated with a single stack frame, for example by performing the entire block on a single function call. In this manner, little or no sensitive data is retained in the execution memory after execution of the block. The device may then proceed to the next block of commands to continue the PA procedure.

In block 312, the LOAD_CLASS command loads a class named platform.SecurityPolicy. In this example, the needed functionality in the class platform.SecurityPolicy is implemented in terms of instance methods. Thus, the next command NEW_INSTANCE in the block creates a new instance of platform.SecurityPolicy. In some embodiment, by default, the NEW_INSTANCE command creates an object of the last class that was loaded by a LOAD_CLASS command. The next commands of block 312 dynamically invokes methods of the instance. In some embodiments, these commands may invoke, by default, the methods of the last created object in the commands. In some embodiments, the GET_METHOD command may place a return result of the method on the results buffer to be sent to the AP server. The CALL_METHOD command may receive no results, but simply be used to invoke the command. In some embodiments, any errors or exceptions that are generated from the methods are also placed on the results buffer to be sent to the AP server. As shown in the CALL_METHOD command, some commands may specify a number of input parameters. In some embodiments, a command may specify a type of the input parameter, for example INT (indicating integer) for the parameter 10. The type may be used by the dynamic command executor to cast or convert the parameter into a particular native type in the execution environment before it is used to invoke the method, e.g., setPasswordMinimumLetters.

In some embodiments, the dynamic command executor may be configured with a built-in security feature, where some platform classes cannot be executed via any commands. For example, restrictions may be made by the namespace of the class modules, so that certain platform classes of the device cannot be launched or invoked via the dynamic command executor. This mechanism prevents a malicious entity masquerading as the PA server from fully exploiting all platform functionalities of the device via the dynamic command executor.

In block 314, the LOAD_CLASS command first loads a class named platform.AppsManager. The CALL_CLASS_METHOD command then invokes a class method named getInstance. In some situations, classes may have different instantiation methods. For example, some classes may implement a class method to provide a singleton instance of the class, instead of allowing users to explicitly construct an object. Thus, here, the CALL_CLASS_METHOD command uses the getInstance method to obtain an object of platform.AppsManager, instead of NEW_INSTANCE command in block 314. The first GET_METHOD command in block 314 then obtains a list of installed apps from the device. The return result from such a command may be an object, such as a Java list. Thus, in some embodiments, these result objects may be converted into character array data. The resulting character array may then be encrypted and placed on the results buffer to be returned to the AP server.

In block 316, a platform.File class is first loaded by the LOAD_CLASS command. The next command NEW_INSTANCE creates an instance of the File class using an input parameter, which represents a file path, and an output parameter, which is preceded by a token ID to indicate that what follows is a variable name to associate with the new object instance, and a variable name file1. In some embodiments, the dynamic command executor may maintain created objects by a command block for the duration of the block, for example by storing the object in a hash table using the variable name. In this manner, later commands in the block, such as the next GET_METHOD command, may refer to the object by its variable name. For example, the next GET_METHOD command invokes the readFile method on the object file1. The next two commands in block 316 creates another instance of the File class under the variable name file2, and then invokes the method write on that variable. As shown, these commands may indicate a particular way of manipulating files on the device. The information indicated in these commands, for example file names, sequence of actions, etc., may represent elements of a proprietary PA process. By sending this information in the form of runtime command parameters, as opposed to statically storing such information on the device, the PA process reduces the risk of such information being reverse engineered.

Figure 4A:
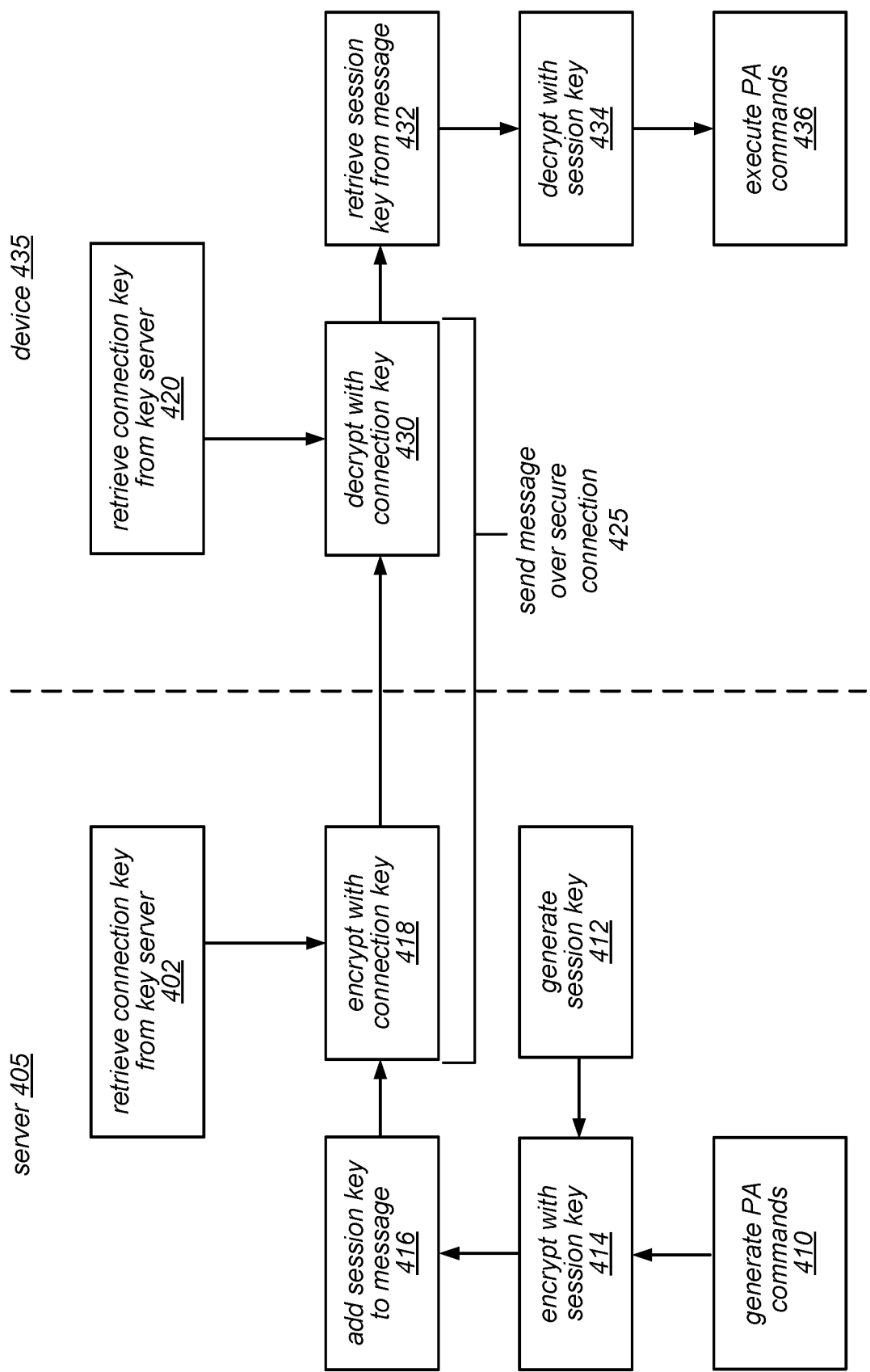
FIGS. 4A and 4B illustrate a process of securing network communication between a server and a device in a dynamic posture assessment system, according to some embodiments.
Figure 4B:
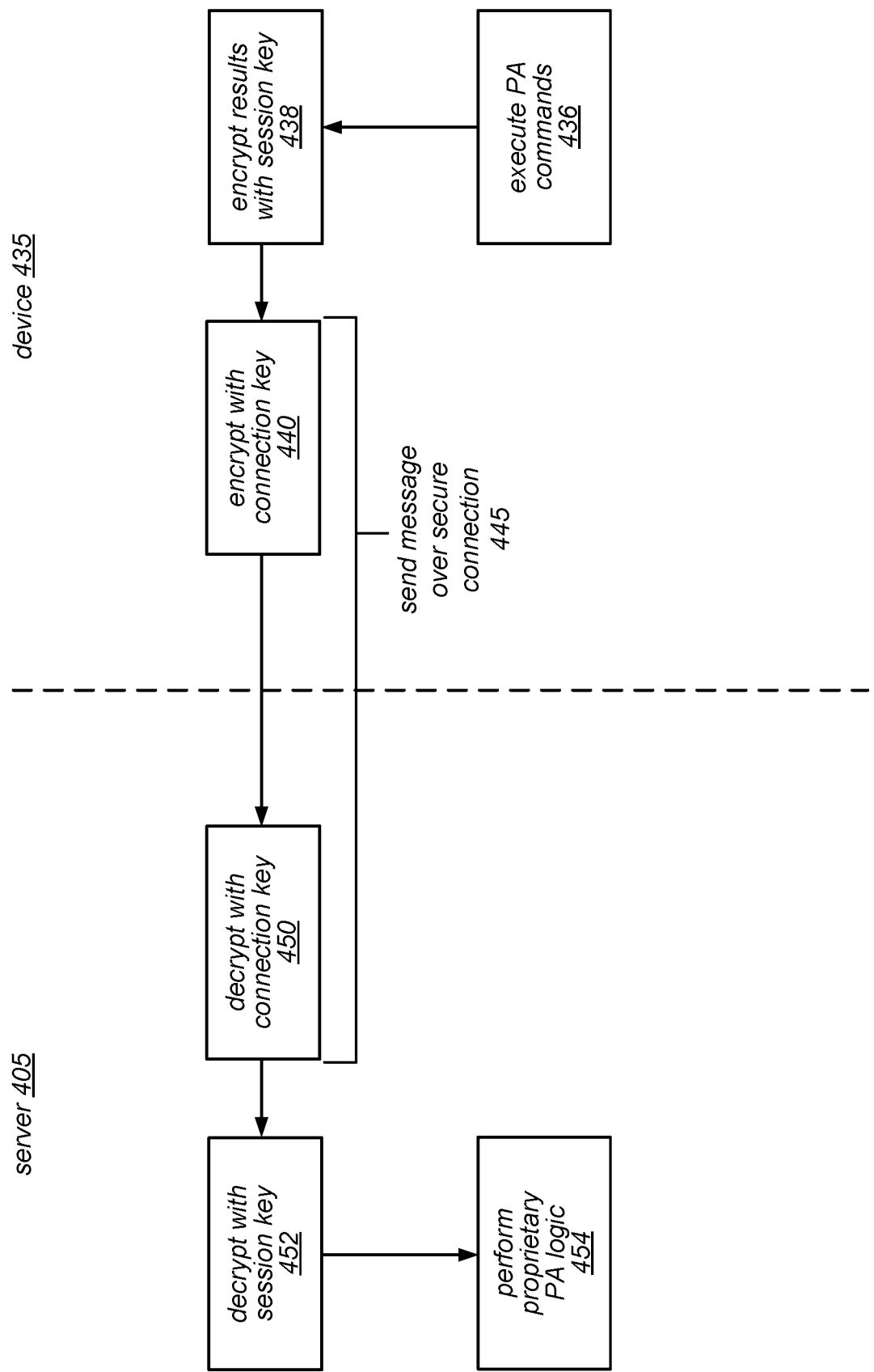

FIGS. 4A and 4B illustrate a process of securing network communication between a server and a device in a dynamic posture assessment system, according to some embodiments. FIG. 4A illustrates a process where commands are sent from the PA server 405 to the device 435 using a multi-layered encryption scheme. The figure illustrates certain concepts in the encryption process, but the precise implementation of the encryption process will vary from embodiment to embodiment. For example, in some embodiments a different number of different types of encryptions may be used.

As illustrated, the PA server 405 first generates PA commands at operation 410. At operation 412, a session key is generated. In some embodiments, the session key may be a single-use symmetric key that is generated relatively quickly. The session key may be generated for each message sent to the device, a group of messages, or in some embodiments, particular commands within a single message. In some embodiments, the session key is used to encrypt the messages, at operation 414, and then added to the message at operation 416. In some embodiments, each command in the message may be encrypted using the same session key, but also slightly differently, based on a random seed that is deterministically obtainable by the device.

At operation 418, the entire message, including the session key and the encrypted commands, are encrypted again using a connection key. The connection key may be previously generated by a key server for the server 405. The key server may be, for example, the key management server 128 as discussed in connection with FIG. 1. At operation 402, the connection key may be retrieved from the key server. In some embodiments, the connection key may be used to generate the secure connection that is used to transmit the message of encrypted commands. In some embodiments, the connection key may be more difficult to generate than the session key, and may be associated with an identity certificate of the server 405. In some embodiments, the connection key may be part of a public key private key pair, where the public key is associated with its owner and provided to the public. By providing two layers of encryption in this manner, the encryption scheme avoids consistently encrypting certain data (e.g. filenames) the same way each time, thus enhancing the encryption protection.

In some embodiments, the secure connection may be implemented differently. For example, in some embodiments, secure connection may be implemented using two different keys for the two directions of communication. For example, the server 405 and device 435 may establish the secure connection by exchanging their respective keys. In some embodiments, the secure connection may be implemented using a standardized secure communication protocol, such as Transport Layer Security (TSL) connections or Secure Sockets Layer (SSL) connections. In some embodiments, more than two layers of encryption may be employed, to guard against different types of vulnerabilities in the network communication.

At operation 425, the encrypted message is transmitted to the device 435 over the secure connection. In addition, the device 435 may retrieve 420 the connection key from the key server to decrypt the message received via the secure channel. To retrieve the connection key, the device 435 may first provide a device credential to key server to authenticate itself with the key server. For example, the device may provide its device ID or a previous obtained login ID to the key server. At operation 430, the message is decrypted using the connection key. As discussed, operations 402, 418, 420, and 430 may be implemented as part of a standard secure communication protocol, which may be used in addition to other encryption techniques used by the PA server 405 and device 435.

At operation 432, the device 435 retrieves the session key from the decrypted message. As discussed, the session key may be prepended or appended to the message by the PA server. At operation 434, the commands in the message are then decrypted using the session key. The decryption may be performed using the session key and other variables, for example a random seed, according to the encryption protocol between the server and the device. In some embodiments, the decryption may occur one command at a time, or one block of commands at a time, so as to keep the number of decrypted commands in the device's memory to a small number. As the commands are decrypted, they can then be parsed and executed by the dynamic command executor, at operation 436.

FIG. 4B illustrates a process where results from the commands are returned back to the PA server 405. The process may happen largely using the same session key and secure connection that was used in sending the commands. However, in some embodiments, the return path may employ a different set of keys and/or secure connections. This approach may prevent a breach on one side of the communicating from compromising the communication in the other direction.

As illustrated, at operation 436, the PA commands are executed by the device 435, producing command results. The results are then encrypted with the session key at operation 438. The session key may be the same session key that was received from the PA server 405, that was used to encrypt the commands. In the return path, the session key is not added back to the message, because the PA server 405 already holds the session key.

At operation 440, the message is encrypted again with the connection key. The doubly encrypted message is transmitted over the secure connection 445 back to the server 405, and decrypted on the server 405 with the connection key, at operation 450. Operations 440, 445, and 450 may be implemented as part of a standard secure connection protocol, such as TLS or SSL, as discussed. At operation 452, the server 405 decrypts the command results using the session key, and at operation 454, the server 405 performs its proprietary PA logic based on the results. In some embodiments, the full PA process may involve several sets of commands to be transmitted to the device 435, and several sets of command results to be returned. In some embodiments, a new session key may be generated for each new set of commands. In some embodiments, a new secure connection may be established for each new set of commands, using rotating connection keys associated with the PA server 405.

FIGS. 5A and 5B illustrate example message and command data formats used in a dynamic posture assessment system, according to some embodiments. FIG. 5A illustrates a message format of a posture assessment system, which may include multiple PA commands 530a-n. Each message may include an encryption key 510, which may be a session key used to encrypt the commands 530a-n, as discussed. In some embodiments, the encryption key 510 may be a 32-byte encryption key. The portion 532 of the message after the encryption key 510 may be encrypted by the encryption key 510. In addition, the entire message 534 may be encrypted by another encryption key, which may be a more long-term use connection key, as discussed. The combination of these two layers of encryption avoids the situation where high frequency parameters (e.g., certain filenames) are consistently encrypted the same way, thereby enhancing the overall encryption of the message.

In the encrypted portion 532, the message may include a length header 520. The length header may include a number of commands that follow in the message body. In some embodiments, each command has a fixed length, so that the length times the command length determines the size of the message. In some embodiments, the commands may be variable length. In such embodiments, the message may delimit each command using a known delimiter, so that the device decoder can decode the commands from the message. In some embodiments, rather than using delimiters, the length header may include a series of values that indicates offsets within the message body corresponding to the starting positions of the commands. In some embodiments, the length header may include other metadata about each command, such as the type of the command, and the number of parameters for that command, etc.

FIG. 5B illustrates example formats for different types of command used in the posture assessment system. In some embodiments, the type may indicate a command type, which may determine how the rest of the command is parsed and then executed. Command types may include for example, a command type to load specified classes, a command type to instantiate objects of specified classes, a command type to invoke specified methods of specified classes or objects, and a command type to access specified attributes of specified classes or objects. In some embodiments, the command types may correspond to the API calls exposed by a dynamic module loading and execution library, such as the Java Reflection library. FIG. 5B illustrates the different formats for each type of command, such as a class load command format 540, object instantiation command format 550, method invocation command format 560, and attribute access command format 570. Depending on the embodiment, the system may include more or less command types and command formats. For example, in some embodiments, the commands may include control commands to indicate command blocks, or in some cases flow control commands to implement basic control logic. Such commands may also have their own command formats.

As illustrated, each command format 540, 550, 560, and 570 may have a respective command type code 542, 552, 562, and 572. This command type code may be the same field in each command format, but holding a different code value indicating the type of command to the PA command parser. In some embodiments, the parsing function of the PA command parser may be dictated by the command type code.

In the class load command format 540, the format may include two fields, which represent input parameters to the command. The class name field 544 specifies the class name to be loaded, and the class path field 546 specifies any class paths that should be used to find the class modules. The class path field 546 may be an optional field.

In the object instantiation command format 550, the format may include a class name field 554, which specifies the class for the object to be instantiated. The result identifier field 556 may indicate an optional parameter that indicates a variable name to associate with the newly instantiated object. The variable name may be used in later commands to refer to the instantiated object. The format may then include a number of parameter fields 558*a-n*, which specify input parameters to the object's constructor method. In some embodiments, parameters may include type information, so that the parameters may be converted into the correct type before they are passed into the constructor method. In some embodiments, the object instantiation command may be variable length to support constructors having a large number of input parameters.

In the method invocation command format 560, the format may include a field 564 for a class name or an object identifier. As discussed, in some programming languages, such as Java, methods may be associated with classes or object of classes. Thus, to dynamically invoke a method, the command may need to refer to classes in some cases and object in other cases. In some embodiments, these two cases may be represented by two different command types having two different command formats. The format 560 may then include a method name field 566, which indicates the name of the method to be invoked. The result identifier field 568 may be an optional parameter that specifies the result returned from the invoked method. The parameter is optional because in some cases the result may not return any results. In some embodiments, the result identifier may be stored in the results buffer with the result, and included in the return message to the PA server to allow the PA server identify the results of individual commands. Finally, the format 560 may also include a number of parameter fields 569 to specify input parameters to the method.

In the attribute access command format 570, the format may include a class name or object identifier field 574, which is similar to the class name or object identifier field 564, and identifies the class or object that an attribute belongs to. The attribute name field 576 specifies the name of the attribute that is being accessed by the command. The result identifier field 578, like the result identifier field 568, is an optional parameter that specifies the result returned from the accessed attribute. In some embodiments, the result identifier may be stored in the results buffer with the result, and included in the return message to the PA server to allow the PA server identify the results of individual commands. The parameters field 579 may specify a new value for the attribute. For example, in some cases an attribute access command may set the value of an attribute instead of retrieving the value. The parameter field 579 may thus be used to specify the new value for the attribute.

Figure 6:
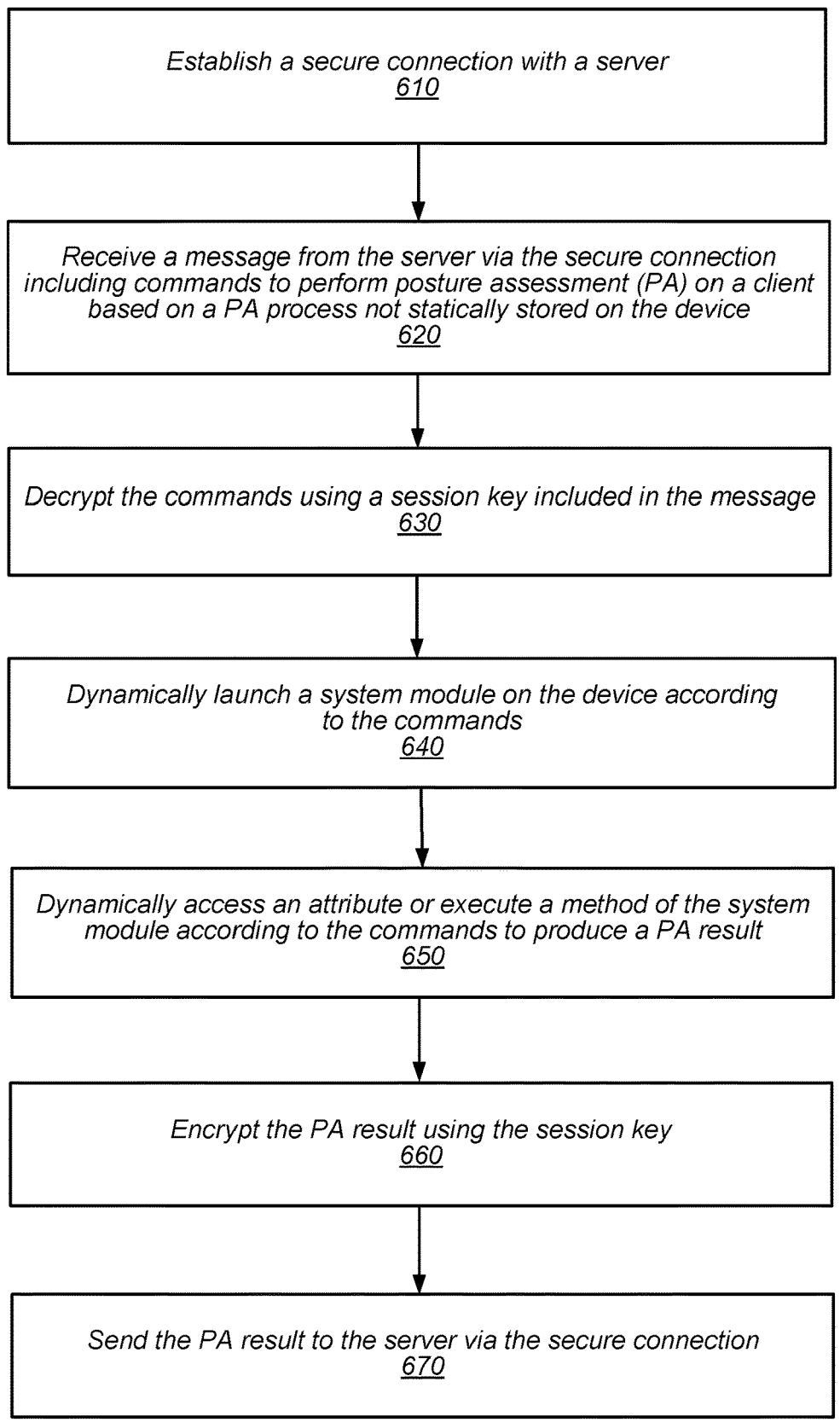
FIG. 6 is flowchart illustrating a process performed by a device in a dynamic posture assessment system, according to some embodiments.

FIG. 6 is flowchart illustrating a process performed by a device in a dynamic posture assessment system, according to some embodiments. The process may be performed by for example device 105, as discussed in connection with FIG. 1.

At operation 610, a secure connection is established with a server. As discussed, the server may implement a process to perform a security posture assessment of the device. The server may thus communicate with the device over the secure connection to perform the PA process. In some embodiments, the device may initiate the secure connection with the server, for example, by requesting to connect with the server's network. In other embodiments, the server may initiate the secure connection with the device, for example via an administrator tool. In some embodiments, the secure connection may be implemented in a thin command executor that is downloaded to the device, for example, the dynamic command executor 110 of FIG. 1. Depending on the embodiment, the dynamic command executor may be downloaded from the PA server or some another server. In some embodiments, the dynamic command executor may be downloaded in response to a request from the device to access a server network, such as server network 125. Depending on the embodiment, the secure connection may be implemented differently. For example, the secure connection may be implemented using two different keys for the two directions of communication, or using just a single key that is used for both directions. In some embodiments, the secure connection may be implemented using a standardized secure communication protocol, such as Transport Layer Security (TSL) connections or Secure Sockets Layer (SSL) connections. In some embodiments, more than two layers of encryption may be employed, to guard against different types of vulnerabilities in the network communication.

At operation 620, a message is received from the server via the secure connection. The message includes commands to perform the PA process on the device, based on a PA procedure that is not statically stored on the device. The PA process may carry out a verification of the security configurations of the device. Because the message is sent over the secure connection, it may be encrypted in transit. The secure connection may handle the encryption and decryption of its messages as part of the marshalling and unmarshalling of the messages. As discussed, the PA process may be dictated by a PA procedure that is maintained by the server's network administrators. The PA procedure may include proprietary information, such as the different types of checks that must be performed during the PA process. The proprietary information may also include other information, such as device properties, metadata, or files that are examined, device files that are examined, and certain manner of interactions with software or metadata on the device. Such information, if made public, may be exploited by attackers to compromise communications or circumvent the PA process. Thus, in some embodiments, such proprietary information is not statically stored on the device. For example, in some embodiments, the configuration data and executable versions of modules or the dynamic command executor 110 do not include any portions of the PA procedure. Rather, such information is specified only in the commands that are generated by the server at runtime.

At operation 630, the commands are decrypted using a session key included in the message. In some embodiments, an additional layer of encryption may be used to encrypt the communications between the server and the device. For example, a session key may be generated for each message, a group of messages, or different portions within a single message. In some embodiments, the server may generate a session key, use the session key to encrypt the commands, and then include the session key in the message transmitted to the device. In some embodiments, subsequent messages between the server and the device may be encrypted using the same session key, until the session key expires. The use of the session key in this manner adds variability to the messages sent by the server. The variability provides additional protection of the messages from attackers by generating, over time, different ciphertext for commonly transmitted words in the messages (e.g. a device property names or file paths).

At operation 640, a module is dynamically launched according to the one or more commands. In some embodiments, the operation may be performed by a dynamic command executor, such as the dynamic command executor 110 of FIG. 1. The module may be a system module of the device. In some embodiments, the module may be dynamically loaded into memory using a name, for example the name of a class implemented by the module. In some embodiments, the launching may include an instantiation step, where an object of a class is instantiated. For example, the object may be a Java object that is an instance of a Java class. In some embodiments, the launching may be accomplished via a dynamic module loading and execution library, for example the Java Reflection library, which is configured to dynamically load and execute Java classes and objects. The dynamic module loading and execution library may perform its functions completely based on runtime parameters, and may not statically include any application specific details such as details of the PA procedure of the server network.

To issue calls to the runtime reflection library, the commands are first parsed. This may be performed by for example the PA command parser 113 of FIG. 1. First, memory may be allocated for the commands. In some embodiments, the PA commands may be received in blocks, as illustrated for example in FIG. 3. Once a message is received at the server, the block of commands may be stored in an execution memory of the device, which may be accessible to the dynamic command executor 110.

In some embodiments, all of the data associated with a PA command, for example the command type, any input parameters, and the result identifier, may be allocated as native type data on a stack frame of a call stack of the dynamic command executor. In this manner, all of the data may be deallocated along with the stack frame, as the call stack changes with the execution. In some embodiments, the dynamic command executor may avoid allocating data associated with the command in memory structures that persist independently from the call stack. For example, in the Java runtime environment, certain data (e.g., object data) are allocated in an object pool. Objects in the object pool are not immediately deallocated with the stack frame. Rather, they are garbage collected at a later time by the execution environment. By avoiding allocating data in the object pool, the dynamic command executor minimizes the amount of time that command parameters are resident in the device's execution memory. In some embodiments, the data associated with each command, such as the input parameters and any results and result identifiers, are deallocated as soon as possible. For example, in some embodiments, such data may be deallocated immediately after a command is executed, immediately after a block of commands is executed, or immediately after all commands in a message are executed. In some embodiments, data associated with the commands are entirely deallocated after the PA process is completed. For example, in some embodiments, the dynamic command executor may launch one JVM process for each message of commands, so that no more than a single message of commands will be present in the device's memory at any given time. As may be understood, using these techniques, risk of reverse engineering (e.g., via a memory dump of the device's runtime memory), is minimized.

In some cases, the PA command may include an optional result identifier, which is used by the system to associate the return value of a method or the value of an attribute that is accessed. In some embodiments, such result identifiers may be stored by the dynamic command executor in a data structure (e.g., a hash table) during the execution of the block of commands, so that they can be accessed by later commands in the block. For example, the result of an instantiation command (an object) may be associated with a result identifier "obj1," so that later commands may invoke object methods from that object by specifying the identifier "obj1." In some embodiments, the result identifier may be included in the return message to the PA server. The result identifier may be stored so that it is associated with the command result that is produced by the command initially specifying the result identifier. In this manner, PA server may use the result identifier (which it specified in its commands) to more easily parse the PA results from the device.

At operation 650, an attribute of the module or a method of the module is dynamically accessed according to the commands to produce a result. The operation may be performed by the dynamic command executor 110 of FIG. 1, for example. The dynamic access may be performed using a runtime reflection library, for example the Java Reflection library, which is configured to perform dynamical invocation of Java class or object methods and Java class or object attributes. The dynamic module loading and execution library may perform its functions completely based on runtime parameters, and may not statically include any application specific details such as details of the PA procedure. A result of the method invocation or attribute access may be saved temporarily in the device's memory. In some embodiments, multiple results generated by multiple commands may be stored in the device's execution memory, before they are collectively sent back to the server in a return message.

At operation 660, the PA result is encrypted using the session key. As discussed in some embodiments, the session key may be used for a group of messages between the device and the server. The session key may be generated by the server and first distributed to the device in the initial message containing the commands. Subsequently, the session key may be used to encrypt all communications between the device and the server during the "session," when the session key is effective. In some embodiments, multiple results may be aggregated in a single message, and the entire message may be encrypted before it is sent to the server.

At operation 670, the result, encrypted, is sent to the server via the secure connection. Thus, the process may involve two different layers of encryption, a first encryption that is performed within the secure connection, and a second encryption that is performed using the session key. The session key may be a quickly generated key that is expired relatively quickly, and the secure connection may employ a strong encryption key that is maintained long term, or rotated more slowly. The combination of multiple layers of encryption increases the security of the communication between the device and the server.

Figure 7:
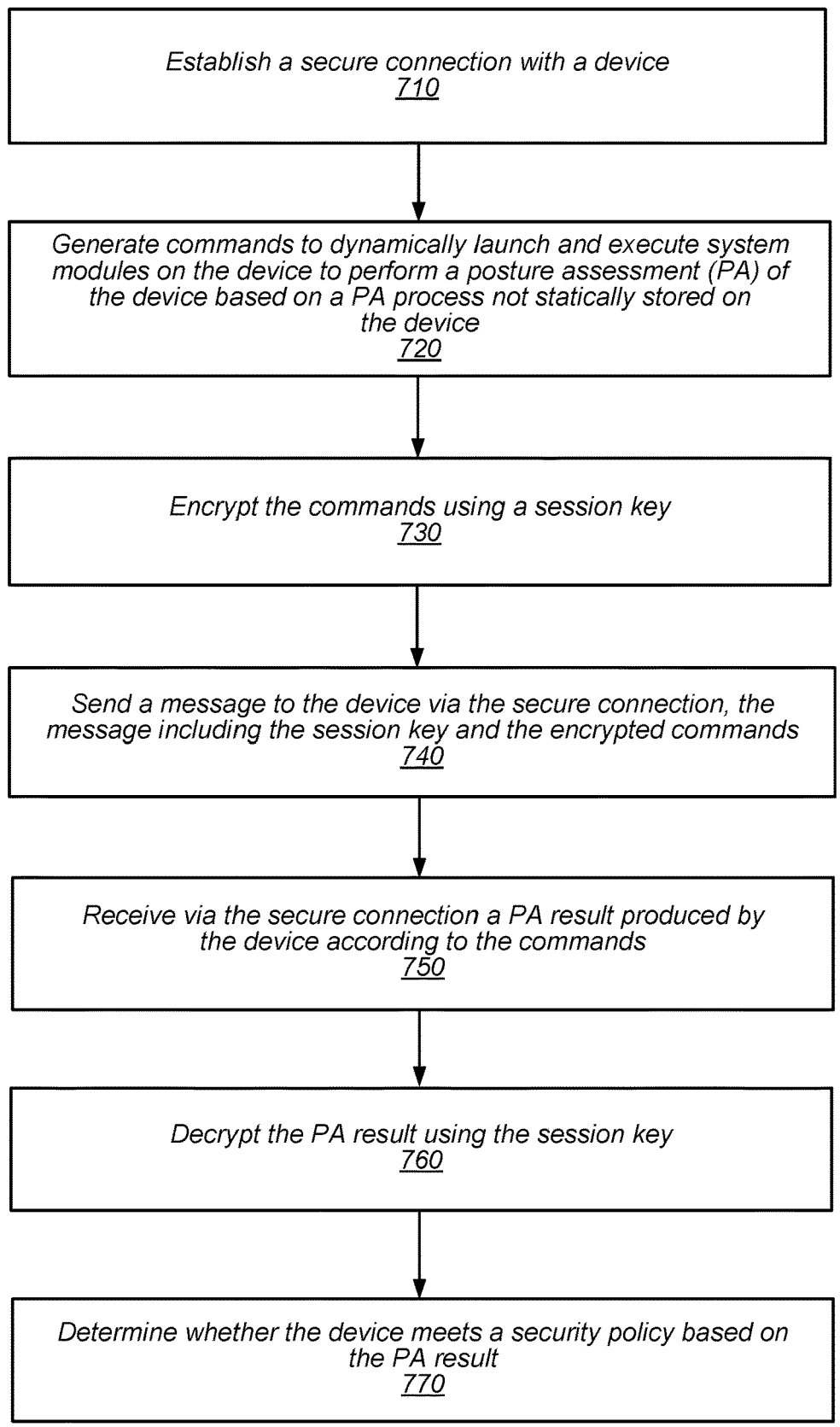
FIG. 7 is flowchart illustrating further aspects of a process performed by a device in a dynamic posture assessment system, according to some embodiments.

FIG. 7 is flowchart illustrating a process performed by a server in a dynamic posture assessment system, according to some embodiments. The process of FIG. 7 may be performed by, for example, the device posture assessor 130, as discussed in connection with FIG. 1.

At operation 710, a secure connection is established with a device. As discussed, the device posture assessor server may implement a process to perform a security posture assessment of the device. The server may thus communicate with the device over the secure connection to perform the PA process. In some embodiments, the secure connection may be implemented in a thin command executor that is downloaded to the device, for example, the dynamic command executor 110 of FIG. 1. In some embodiments, the secure connection may be implemented using an encryption key associated with the server obtained from a key management server, such as key management server 128 of FIG. 1. In some embodiments, the secure connection may be implemented using a standardized secure communication protocol, such as Transport Layer Security (TSL) connections or Secure Sockets Layer (SSL) connections. In some embodiments, more than two layers of encryption may be employed, to guard against different types of vulnerabilities in the network communication.

At operation 720, commands are generated to dynamically launch and execute system modules on the device, to perform a posture assessment of the device based on a PA process not statically stored on the device. In some embodiments, the dynamic launch and execution may be performed by the dynamic command executor. The dynamic command executor may take the commands and convert the commands into calls to a runtime reflection library to dynamically launch and execution modules on the device. The dynamic command executor and the modules may not statically embed any information about the PA procedure, so as to protect the PA procedure from being reverse engineered via attacks on the device. The generated commands may correspond to the different types of calls that are exposed by the runtime reflection library.

At operation 730, the commands are encrypted using a session key. This operation may be performed, for example, by the encryption/decryption module 136, as discussed in connection with FIG. 1. The session key may be generated by the server and used in addition to the secure connection. Thus, in some embodiments, the commands may be encrypted in multiple layers. The session key may be changed frequently. For example, the session key may be generated once per message, or once per group of messages. By varying the session key over time, the encryption scheme is made stronger.

At operation 740, a message is sent to the device via the secure connection, where the message includes the session key and the encrypted commands. In some embodiments, the session key may be prepended to the encrypted commands to produce the message, and then the message will be encrypted again as it is marshalled through the secure connection.

At operation 750, a PA result is received via the secure connection. The PA result is produced by the device according to the commands. As discussed, the commands may cause a dynamic command executor on the device to perform certain operations on the device to perform a PA process on the device. For example, the commands may gather certain security information about the device, such as the operating system of the device, the version of the operating system, one or more build flag used to build the version of the operating system, whether the device has been rooted, the apps that are installed on the device, any security patches that are installed on the device, or one or more security settings of the device. These results are then sent back to the PA server. The PA process is carried out as a command-driven process, where certain proprietary information concerning the PA procedure are only provided as command parameters, and not stored on the device. By not statically storing such information on the device, the process protects the PA procedure from reverse engineering attacks.

At operation 760, the PA result is decrypted using the session key. This operation may be performed by the encryption/decryption module 136, as discussed in connection with FIG. 1. As discussed, depending on the embodiment, the session key may be reused for a number of messages. In other embodiments, the session key generated and used only once per message.

At operation 770, a determination is made whether the device meets a security policy based on the PA result that is received. This operation may be performed by, for example, the posture assessment logic 132 discussed in connection with FIG. 1. In some embodiments, the determination may be performed by examining the PA results using a series of checks to verify that the device's security configurations satisfy the service network's security policy. For example, such checks may include verifying that the device has its PIN and encryption feature enabled, that the device has not been rooted, and that the device does not contain any blacklisted malware, etc.

In some embodiments, once it is determined that the device meets a security policy, the PA server may programmatically perform security actions associated with the device. Such actions may include, for example, granting an access privileged to the device, sending security software to the device, or updating a security setting on the device. For example, in some embodiments, based on the determination, the device may be permitted to connect to other servers in the server network (e.g., server network 125). In some embodiments, the device may be added to a registry of devices that are known by the server network (e.g., by storing the device's ID in an access list). In some embodiments, after the device passes the PA process, additional software such as a company's proprietary software may be pushed to the device. In some cases, servers in the server network may initiate communication with the device to make adjustments to the security settings on the device. In some embodiments, the PA process may occur as a periodic check of the device by the server network, to occasionally verify that the health and compliance of the device. For example, a server network may implement a periodic process (e.g. monthly check) to examine all of its employees' devices to check for any malware that may have been installed on these devices.

Figure 8:
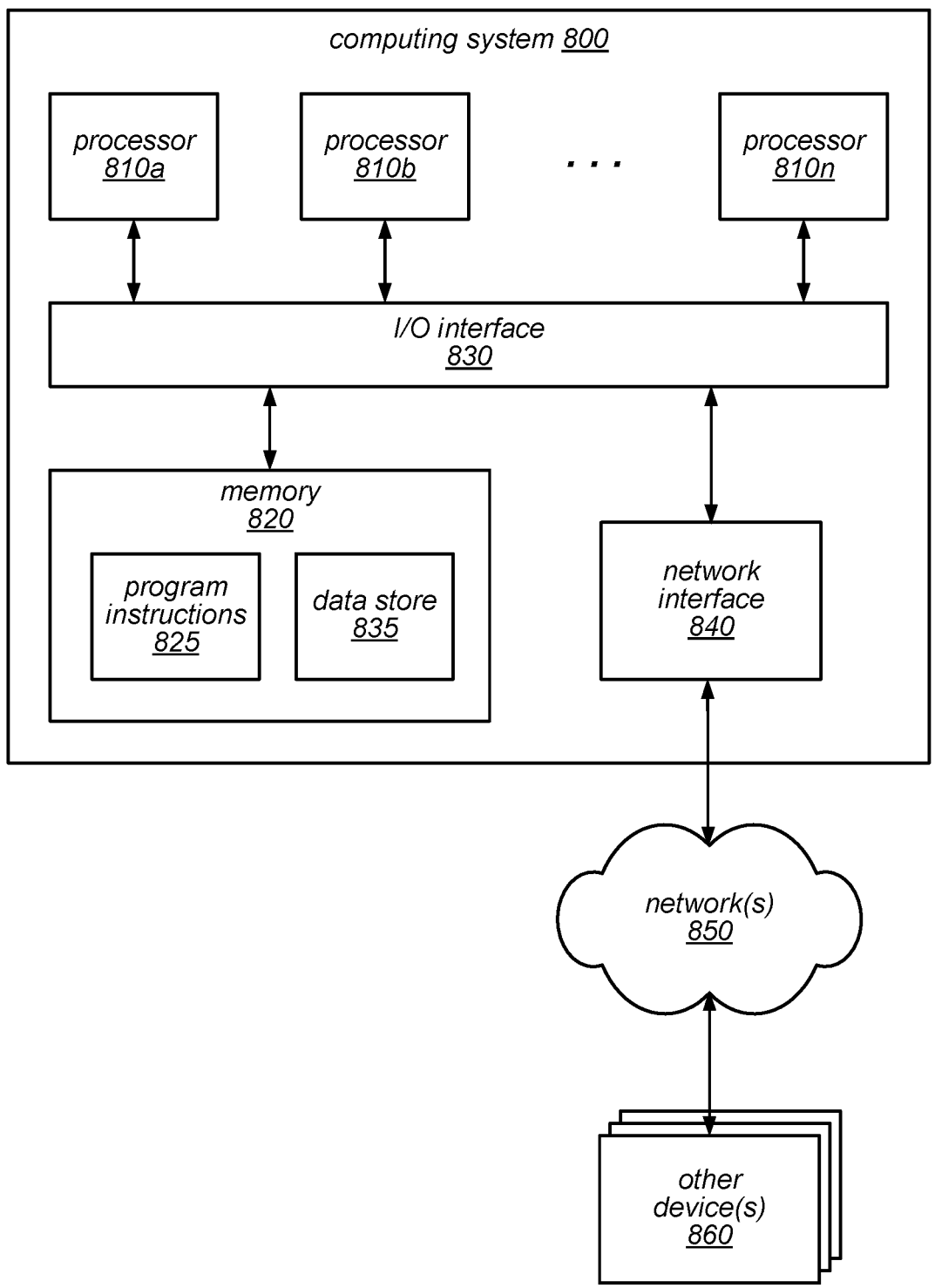
FIG. 8 is flowchart illustrating a process of generating command parameters for commands that are used in a dynamic posture assessment system, according to some embodiments.

FIG. 8 is a block diagram illustrating an example computer system that can be used to implement one or more portions of a database that implements a fast recovery in a partitioned replicated data store, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 835.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices, such as routers and other computing devices, as illustrated in FIGS. 1 through 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a server implemented by one or more processors and associated memory, and configured to:
generate one or more commands for sending over a network to respective dynamic command executor runtimes of a plurality of devices to perform a posture assessment procedure of the devices, wherein individual ones of the dynamic command executor runtimes are configured to receive the one or more commands from the server that generated the one or more commands and execute the one or more commands on respective ones of the devices to verify security configurations of the respective devices but not store the one or more commands;
send, over the network, the one or more commands to the respective dynamic command executor runtimes of the devices in one or more respective messages;
receive respective posture assessment results produced by the devices according to the commands in the respective messages; and
determine whether individual ones of the plurality of devices meets a security policy based at least in part on a respective posture assessment result for the respective device.

2. The system of claim 1, wherein the posture assessment procedure is implemented by the server, and the server implements a plurality of posture assessment procedures for different devices.

3. The system of claim 1, wherein:
the server is configured to establish secure connections with the devices using a connection key stored on a key management server; and
the server is configured to encrypt the messages using the connection key.

4. The system of claim 3,
wherein to send the one or more commands, the server is configured to:
encrypt the one or more commands using a session key, and
include the session key in a message such that the session key is encrypted by connection key.

5. A method, comprising:
performing, by a device including one or more processors and associated memory:
receiving, by a dynamic executor runtime, a message from a server that generated the message to perform a posture assessment procedure on the device, wherein the posture assessment procedure verifies security configurations of the device;
determining, by the dynamic executor runtime, a plurality of commands from the message;
launching and executing a routine on the device according to the plurality of commands to perform the posture assessment procedure without storing the plurality of commands; and
sending to the server a posture assessment result produced by the execution of the method.

6. The method of claim 5, further comprising:
prior to receiving the message, downloading a dynamic command execution software to the device, and wherein said receiving, determining, launching and executing, and sending are performed by the dynamic command execution software.

7. The method of claim 5, wherein launching and executing the routine on the device is performed using a runtime reflection library stored on the device.

8. The method of claim 7, wherein the launching and executing comprises:
issuing a call to the runtime reflection library to load a class or instantiate an object; and
issuing another call to the runtime reflection library to interact with the class or the object to obtain security information about the device.

9. The method of claim 8, wherein obtaining security information about the device comprises determining one or more of: a version of an operating system of the device, one or more build flags used to build the version of the operating system, whether the device is configured to permit root user access, applications that are installed on the device, security patches that are installed on the device, or one or more security settings of the device.

10. The method of claim 5, wherein determining the plurality of commands from the message comprises parsing the plurality of commands to determine type codes indicating types of commands, including a command type to load specified classes, a command type to instantiate objects of specified classes, a command type to invoke specified methods of specified objects or classes, and a command type to access specified attributes of specified objects or classes.

11. The method of claim 5, wherein a command of the plurality of commands specifies a result identifier, and wherein the sending of the posture assessment result comprises:
packaging the posture assessment result such that a result from execution of the command is identified by the result identifier.

12. The method of claim 5, further comprising:
storing the commands, input parameters for the commands, and results from execution of the commands in data structures that are deallocated at the end of the posture assessment.

13. The method of claim 5, further comprising:
providing a device credential to a key management service to authenticate the device; and
receiving a connection key from the key management service; and
wherein the message received from the server and the posture assessment result sent to the server are encrypted using the connection key.

14. The method of claim 5, further comprising:
establishing a Transport Layer Security (TSL) connection with the server; and
wherein receiving the message from the server and sending the posture assessment result to the server are performed using the TSL connection.

15. The method of claim 5,
wherein determining the plurality of commands from the message comprises:
decrypting the message using a connection key;
retrieving a session key from the message; and
decrypting the plurality of commands in the message using the session key; and
wherein sending the posture assessment result to the server comprises:
encrypting the posture assessment result using the session key to produce a return message; and
encrypting the return message using the connection key.

16. A non-transitory computer-accessible storage medium storing program instructions that when executed on one or more processors of a system cause the system to:
generate a plurality of commands to be sent over a network to a device for the device to perform a posture assessment of the device, wherein the posture assessment checks security configurations of the device, and the plurality of commands generated by the system and received by a command executor runtime of the device cause the device to launch and execute one or more routines on the device to perform the posture assessment without storing the plurality of commands;

send, over the network, the plurality of commands in a message to the command executor runtime of the device;

receive a posture assessment result produced by the device according to the plurality of commands; and determine whether the device meets a security policy.

17. The non-transitory computer-accessible storage medium of claim 16, wherein the program instructions when executed on the one or more processors cause the system to:

based at least in part on the determination of whether the device meets the security policy, perform a security action for the device comprising one or more of: granting an access privileged to the device, sending security software to the device, or updating a security setting on the device.

18. The non-transitory computer-accessible storage medium of claim 16, wherein the program instructions when executed on the one or more processors cause the system to:

prior to sending the plurality of commands, provide to the device a software configured to receive the plurality of commands.

19. The non-transitory computer-accessible storage medium of claim 16, wherein the program instructions when executed on the one or more processors cause the system to generate commands of different types, including a command type to load specified classes, a command type to instantiate objects of specified classes, a command type to invoke specified methods of specified objects or classes, and a command type to access specified attributes of a specified objects or classes.

20. The non-transitory computer-accessible storage medium of claim 16, wherein:

to send the plurality of commands, the program instructions when executed on the one or more processors cause the system to:

encrypt the plurality of commands using a session key, include the session key and the encrypted commands in the message to be sent to the device; and encrypt the message using a connection key; and to receive the posture assessment result, the program instructions when executed on the one or more processors cause the system to:

decrypt a return message from the device containing the posture assessment result using the connection key; and decrypt the posture assessment result using the session key.

\* \* \* \* \*